(12) United States Patent
Elyashiv et al.

(10) Patent No.: US 10,193,982 B2
(45) Date of Patent: Jan. 29, 2019

(54) SYSTEMS AND METHODS FOR RECONNECTING CALLS

(71) Applicant: SECURE CONNECTION LTD., Zikhron Yakov (IL)

(72) Inventors: Tal Elyashiv, Ramat-HaSharon (IL); Yoseph Taguri, Tel-Aviv (IL); Shmuel Ur, Shorashim (IL)

(73) Assignee: SECURE CONNECTION LTD., Zikhron Yakov (IL)

( * ) Notice: Subject to any disclaimer, the term of this patent is extended or adjusted under 35 U.S.C. 154(b) by 526 days.

(21) Appl. No.: 14/816,013

(22) Filed: Aug. 2, 2015

(65) Prior Publication Data
US 2016/0323418 A1 Nov. 3, 2016

Related U.S. Application Data

(63) Continuation-in-part of application No. 14/698,919, filed on Apr. 29, 2015, now Pat. No. 9,277,015.

(51) Int. Cl.
*H04L 12/58* (2006.01)
*H04L 29/06* (2006.01)
*H04L 29/08* (2006.01)

(52) U.S. Cl.
CPC ............ *H04L 67/141* (2013.01); *H04L 51/04* (2013.01); *H04L 65/00* (2013.01)

(58) Field of Classification Search
None
See application file for complete search history.

(56) References Cited

U.S. PATENT DOCUMENTS

| 4,555,781 A | 11/1985 | Baldry et al. |
| 5,467,388 A | 11/1995 | Redd, Jr. et al. |

(Continued)

FOREIGN PATENT DOCUMENTS

| CN | 101426185 | 5/2009 |
| CN | 102055832 | 5/2011 |

(Continued)

OTHER PUBLICATIONS

Droidural "Polite Call Reject, V1.1", SlideMe LLC, 3 P., Mar. 11, 2012.

(Continued)

*Primary Examiner* — Brian Whipple
(74) *Attorney, Agent, or Firm* — Pearl Cohen Zedek Latzer Baratz LLP

(57) ABSTRACT

There is provided a method performed by a server, comprising: detecting a dropping of a bidirectional voice communication on a communication segment between a first client terminal and the server, the communication segment part of the bidirectional voice communication established between the first client terminal and a second client terminal using respective communication segments with the server, the dropping triggered by insufficient resources for maintaining the bidirectional voice communication in a desired quality for the first client terminal, receiving at least one message from the first client terminal, the at least one message including instructions for restoring the bidirectional voice communication, the at least one message received over available resources sufficient for transmission of the at least one message over the affected communication segment; and restoring the bidirectional voice communication according to the received instructions when sufficient resources are available for maintaining the bidirectional voice communication at the desired quality.

13 Claims, 3 Drawing Sheets

(56) References Cited

U.S. PATENT DOCUMENTS

| | | | |
|---|---|---|---|
| 5,566,236 | A | 10/1996 | MeLampy et al. |
| 6,198,916 | B1 | 3/2001 | Martin et al. |
| 7,233,788 | B2 | 6/2007 | Kedem |
| 7,818,003 | B2 | 10/2010 | Callaghan |
| 8,068,824 | B2 | 11/2011 | Shan et al. |
| 8,467,354 | B1 | 6/2013 | Jerkunica et al. |
| 8,831,591 | B2 | 9/2014 | Kotecha et al. |
| 8,897,786 | B2 | 11/2014 | Ryu et al. |
| 8,942,685 | B2 | 1/2015 | Weksler et al. |
| 2002/0118807 | A1 | 8/2002 | Pedersen |
| 2002/0146107 | A1 | 10/2002 | Baals et al. |
| 2002/0161604 | A1 | 10/2002 | Kardos et al. |
| 2005/0141511 | A1* | 6/2005 | Gopal .............. H04W 76/046 370/395.2 |
| 2005/0159138 | A1* | 7/2005 | Florkey .............. H04L 12/66 455/414.1 |
| 2005/0201362 | A1 | 9/2005 | Klein et al. |
| 2006/0129643 | A1* | 6/2006 | Nielson .............. H04L 12/1831 709/206 |
| 2006/0183514 | A1 | 8/2006 | Patton |
| 2007/0165554 | A1 | 7/2007 | Jefferson et al. |
| 2008/0081627 | A1* | 4/2008 | Shan .............. H04W 76/028 455/445 |
| 2009/0049125 | A1 | 2/2009 | Channabasavaiah |
| 2009/0086953 | A1 | 4/2009 | Vendrow |
| 2009/0109961 | A1* | 4/2009 | Garrison .............. H04L 12/66 370/352 |
| 2009/0257576 | A1 | 10/2009 | Wellard et al. |
| 2010/0150332 | A1 | 6/2010 | Soo et al. |
| 2010/0189094 | A1* | 7/2010 | Gray .............. H04L 12/66 370/352 |
| 2011/0096673 | A1* | 4/2011 | Stevenson .............. H04M 3/50 370/252 |
| 2012/0008759 | A1 | 1/2012 | Mcfeeters |
| 2012/0297368 | A1 | 11/2012 | Bingell et al. |
| 2014/0341081 | A1 | 11/2014 | Efrati et al. |
| 2015/0023485 | A1 | 1/2015 | Guarriello |
| 2016/0234667 | A1 | 8/2016 | Kidron et al. |
| 2016/0323326 | A1 | 11/2016 | Elyashiv et al. |
| 2017/0134575 | A1 | 5/2017 | Quilici et al. |

FOREIGN PATENT DOCUMENTS

| | | |
|---|---|---|
| WO | WO 98/57480 | 12/1998 |
| WO | WO 2013/181921 | 12/2013 |

OTHER PUBLICATIONS

Tacoty "Call Block [Block Call or SMS]—Android Apps on Google Play", Tacoty App, Google, 3 P., Jul. 8, 2015.

Zukerman "A Better Way to Block Unwanted Calls on Your Android Phone", Makeuseof, 4 P., Jun. 14, 2012.

Official Action dated Aug. 24, 2015 From the US Patent and Trademark Office Re. U.S. Appl. No. 14/698,919.

Official Action dated Jan. 5, 2018 From the US Patent and Trademark Office Re. U.S. Appl. No. 14/827,391. (24 pages).

Igor "Fun with Call Forwarding", Retrieved from www.krazyworks.com, 8 Pages, Oct. 31, 2011.

Voipo "Great Forwarding Number for Annoying Calls", Retrieved from voipo.com, 6 Pages, Dec. 2010.

* cited by examiner

SYSTEMS AND METHODS FOR RECONNECTING CALLS

RELATED APPLICATION

This application is a Continuation-in-Part (CIP) of U.S. patent application Ser. No. 14/698,919 filed Apr. 29, 2015, the contents of which are incorporated herein by reference in their entirety.

BACKGROUND

The present invention, in some embodiments thereof, relates to systems and methods for reconnecting phone calls and, more specifically, but not exclusively, to systems and methods for reconnecting phone calls made over packet networks.

Phone calls between two parties may be cut off before the parties complete the call themselves by hanging up. Such undesired early termination of the phone conversation is sometimes referred to as a dropped call. Dropped calls may occur, for example, when a wireless telephone user enters a region in which reception is poor or absent, for example, an elevator. To continue the phone call, users may manually redial to establish a new phone call.

SUMMARY

According to an aspect of some embodiments of the present invention there is provided a method for restoring bidirectional voice communication between at least two client terminals, comprising: detecting, by a server, a dropping of a bidirectional voice communication on a communication segment between a first client terminal and the server, the communication segment part of the bidirectional voice communication established between the first client terminal and a second client terminal using respective communication segments with the server, the dropping triggered by insufficient resources for maintaining the bidirectional voice communication in a desired quality for the first client terminal, receiving, at the server, at least one message from the first client terminal, the at least one message including instructions for restoring the bidirectional voice communication, the at least one message received over available resources sufficient for transmission of the at least one message over the affected communication segment; and restoring, by the server, the bidirectional voice communication according to the received instructions when sufficient resources are available for maintaining the bidirectional voice communication at the desired quality.

Optionally, the method further comprises receiving at least one second message from the second client terminal, and wherein the restoring is performed in response to the at least one message and the at least one second message. Optionally, the method further comprises analyzing the received instructions from the first client terminal and the second client terminal to identify common instructions for restoring the bidirectional voice communication.

Optionally, the method further comprises transmitting, at least one second message from the server to at least one of the first client terminal and the second client terminal, the transmitting performed in response to detecting the dropping, the at least one second message including a request to receive instructions for restoring the bidirectional voice communication.

Optionally, the method further comprises transmitting at least one third message from the server to at least one of the first client terminal and the second client terminal to negotiate common instructions for restoring the bidirectional voice communication.

Optionally, the bidirectional voice communication and the at least one first message are transmitted over a common communication interface having common resources.

Optionally, the bidirectional voice communication remains active during a state of the insufficient resources for maintaining bidirectional voice communication in the desired quality and sufficient resources for sending at least one message. Optionally, the server periodically transmits at least one third message to at least one of the first client terminal and the second client terminal to maintain the active bidirectional voice communication.

Optionally, the restoring is performed at a preselected time according to the instructions received from at least one of the first client terminal and the second client terminal.

Optionally, the method further comprises automatically generating at least one request according to an analysis of at least one quality parameter of the bidirectional voice communication session, and transmitting the at least one request from the server to a network node administering the bidirectional voice communication, the at least one request including a request to increase network resources to restore the bidirectional voice communication to the desired quality.

According to an aspect of some embodiments of the present invention there is provided a method for restoring bidirectional voice communication between at least two client terminals, comprising: establishing, a bidirectional voice communication between a first and a second client terminal, wherein each client terminal is in communication with a server using a respective independent communication segments; detecting, by the first client terminal, a dropping of the bidirectional voice communication on the communication segment between the first client terminal and the server, the dropping triggered by insufficient resources for maintaining the bidirectional voice communication in a desired quality; receiving from a user, using a physical user interface associated with the first client terminal, instructions for restoring the bidirectional voice communication; transmitting, from the first client terminal, at least one message including the received instructions using available resources to the server over the affected communication segment; and resuming the bidirectional voice communication with the second client terminal when the server restores the bidirectional voice communication.

Optionally, the method further comprises transmitting data between the first client terminal and at least one of the second client terminal and the server, the transmitted data designed to maintain the bidirectional voice communication in the active state.

Optionally, the bidirectional voice communication is maintained in an active state in the background of the first client terminal, while another bidirectional voice communication is executed in a foreground to a third client terminal.

Optionally, the method further comprises automatically activating an instant message session between the first client terminal and the second client terminal in response to the detecting.

According to an aspect of some embodiments of the present invention, there is provided a system for restoring bidirectional voice communication between a caller client device and a callee client device, comprising: a server comprising: first communication interface for detecting dropping of a communication segment of a bidirectional voice communication established between a first client terminal and a second client terminal, wherein each client terminal is in communication with the server using respective communication segments, the dropping triggered by insufficient resources for maintaining the bidirectional voice communication in a desired quality over the respective communication segment; a second communication interface for communicating with at least one of the client terminals using messages over available resources sufficient for transmission of at least one message over the affected communication segment; a program store storing code; a processor coupled to the first communication interface, the second communication interface, and the program store for implementing the stored code, the code comprising: code to detect the dropping of the bidirectional communication by the affected communication segment of the first client terminal, receive at least one message from the first client terminal, the at least one message including instructions for restoring the bidirectional voice communication, and restore the bidirectional voice communication according to the received instructions when sufficient resources are available for maintaining the bidirectional voice communication at the desired quality.

Optionally, the communication between the server and at least one of the first and second client terminals is based on a message mechanism selected from the group consisting of: instant messaging (IM), short message service (SMS), and in-application messages.

Optionally, the system further comprises code for installation on the first and second client terminals, the code including instructions to present a graphical user interface (GUI) on a physical user interface associated with the respective client terminal in response to detecting insufficient resources for maintaining the bidirectional voice communication at the desired quality, the GUI including code to receive the instructions from the respective user for coordinating the restoration of the bidirectional voice communication, and transmit the instructions to the server within the at least one message.

Optionally, the system further comprises a GUI for installation on the first and second client terminals, the GUI automatically accesses a calendar application installed on respective client terminal, identifies at least one available time slot according to the calendar application, and presents suggested times for the restoration of the bidirectional voice communication according to the at least one available time slot.

Optionally, the system further comprises a GUI for installation on the first and second client terminals, the GUI applies machine learning methods to learn patterns of at least one quality value related to resources providing the voice communication session, predicts options for the restoration of the bidirectional voice communication according to the machine learning, and presents suggested options for the restoration according to the prediction. Optionally, the learning comprises analyzing patterns of the at least one quality value as a function of time, wherein the prediction comprises at least one time period when sufficient resources are predicted to be available for the desired quality. Alternatively or additionally, the learning comprises analyzing patterns of the at least one quality value as a function of geographical location of the respective client terminal, wherein the prediction comprises identifying at least one geographical location of the respective client terminal associated with sufficient resources available for the desired quality, and wherein the suggested options comprises a notification that a current geographical location is different than the identified at least one geographical location.

Optionally, the system further comprises a GUI for installation on the first and second client terminals, the GUI extracts a relationship type between users of the first and second client terminals from a social network application, identifies options for the restoration of the bidirectional voice communication according to an analysis of the relationship type, and presents suggested options for the restoration according to the identified options.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
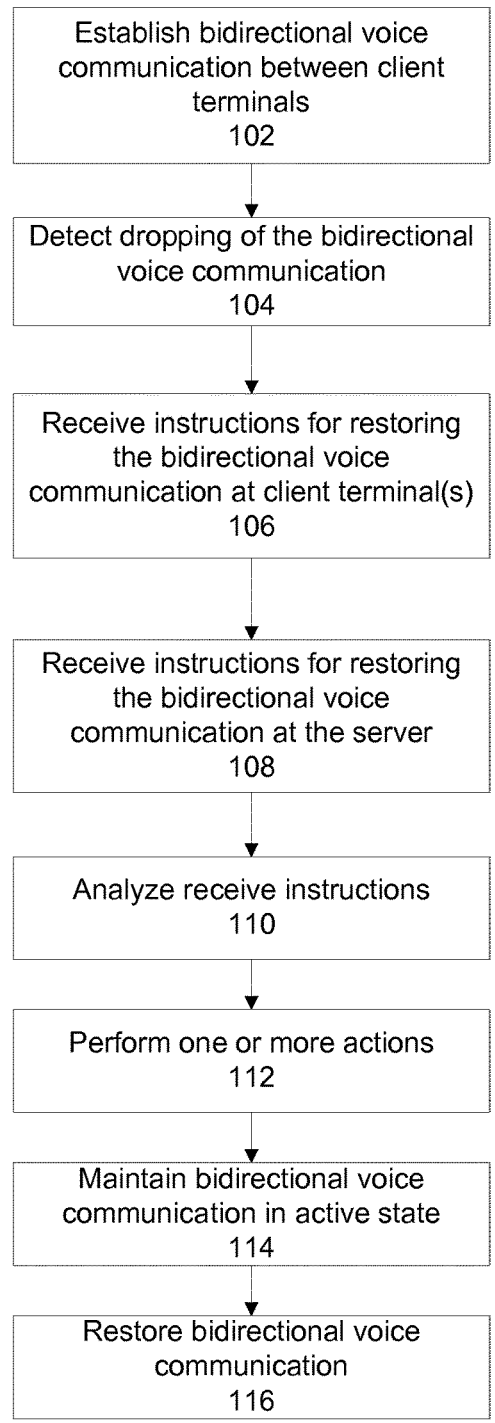
FIG. 1 is a flowchart of a method for reconnecting a bidirectional voice communication between client devices, in accordance with some embodiments of the present invention.

The present invention, in some embodiments thereof, relates to systems and methods for reconnecting phone calls and, more specifically, but not exclusively, to systems and methods for reconnecting phone calls made over packet networks.

An aspect of some embodiments of the present invention relates to code for implementation by a processing unit of a server (and/or methods performed by the server) to detect a dropping of a bidirectional voice communication (e.g., phone call and/or video call), optionally over a packet network, between two or more client terminals (e.g., of a caller and a callee) and reconnect the bidirectional voice communication according to instructions received from the affected client terminal using one or more messages transmitted from the affect client terminal to the server over remaining resources sufficient for transmission of messages. When each client terminal is connected to the server, each segment between respective client terminal and the server may be independent, allowing for one segment to be dropped while the other segment remains unaffected.

The server receives message(s) from one or both respective client terminal with respective instructions for restoring the bidirectional voice communication. The server optionally restores the bidirectional voice communication according to the received instructions when sufficient resources are available for the desired quality (e.g., to restore the phone call). In this manner, the systems and/or methods automatically utilize remaining available resources to receive instructions to reconnect bidirectional voice communication, without requiring redialing to establish a new connection (e.g., manually and/or automatic redial).

Optionally, the server performs an analysis of the messages received from the client terminals to coordinate the instructions for restoration. For example, when one client terminal wants to restore and another client terminal does not want to restore, no restoration is performed. When both client terminals want to restore, the server attempts restoration as soon as resources become available. When one client terminal provides time slots for restoration, the server attempts restoration according to the time slot. When both clients terminals provide time slots, the server identifies common time slot(s) for restoration.

Optionally, different options are available to the users of the client terminals in providing responding instructions to the server. One or both users may select to not restore the bidirectional voice communication. In such a case, the server may disconnect the bidirectional voice communication. Each user may select different conditions for restoring the bidirectional voice communication, for example, different future periods of time. In such a case, the server may negotiate between the users to identify common instructions for the restoration, optionally by transmission of additional messages.

The resources required to conduct the bidirectional voice communication at the desired quality level may be represented by a first threshold. The required resources (e.g., to prevent dropping of the call) are optionally related to available packet network resources, for example, bandwidth, wireless signal strength, packet delay, packet loss, error rate, and jitter. Decrease in a quality value (e.g., below the first threshold) represents a fall below the desired quality of the voice conversation to below a tolerable level, for example, which may otherwise lead to a dropped call and/or automatic disconnection (i.e., without the systems and/or methods described herein).

The resources sufficient for transmitting messages between client terminals and/or between the server and client terminal(s) may be represented by a second threshold. The resources are sufficient to transmit messages, for example, packet(s), using short message service (SMS), instant messaging (IM), email, in-application messages, or other message transmission mechanisms. Optionally, when the quality value is above the second threshold and below the first threshold, the server and/or client terminals may communicate with each other using messages transmitted over the available resources, but may not be able to communicate using voice calls and/or video calls over the available resources.

Optionally, the bidirectional voice communication may be maintained in an active state, optionally by preventing the underlying channel from being disconnected. The bidirectional voice communication (e.g., the segment between one of the client terminals and the server) may be kept active when resources are insufficient for desired quality but are sufficient for transmission of messages (e.g., during the time period from when the quality value dropped below the first threshold, until the quality value returned above the first threshold). When sufficient resources become available (e.g., the quality value is restored to above the first threshold (not necessarily to the same or similar previous quality value)), the bidirectional voice communication may be restored over the same established session, for example, by transmission of voice packet (e.g., voice over internet protocol (VoIP)). The other bidirectional voice communication segment between the other client terminal and server, for which resources remained sufficient for the desired quality, may be maintained in the active state until resources are restored to the segment that experienced the resource shortage.

Optionally, the voice communication session is restored without establishing a new voice communication session, for example, without redialing the phone number of the callee. The same voice communication session becomes available for users to use for voice and/or video conversations. Alternatively, the server coordinates a new voice communication session based on the instructions. In either case, the users do not need to explicitly attempt dialing each other.

Optionally, patterns of dropped communications on other segments, a history of dropped communications on the same affected segment, and/or a quality value of the communication segment may be analyzed to predict when sufficient resources are available to provide the desired quality of the bidirectional voice communication (e.g., improvements in the quality value above the first threshold to allow voice and/or video calls). The analysis may be performed as a function of time and/or date, geographical location of respective client terminals, and/or other parameters. The analysis may predict future periods of time during which sufficient resources are available to provide the desired quality (e.g., when the quality value is expected to be restored above the first threshold), for example, based on a daily pattern, weekly pattern, or other pattern. The analysis may predict geographical locations of the respective client terminal at which sufficient resources are available to provide the desired quality (e.g., where the quality threshold is expected to be restored above the first threshold). The restoring may be performed when the client terminal reaches the predicted geographical location and/or when the time and/or date arrives. Message(s) may be transmitted by the server to the client terminal(s) with information on improving the available resources, for example, instructions to go to the identified geographical location, and/or instructions to wait for the predefined time and/or date. Alternatively or additionally, the analysis may be performed locally by code on the client terminal. A GUI may present the results of the analysis and/or the messages on the display of the client terminal, optionally as suggested options for user selection.

An aspect of some embodiments of the present invention relates to code for implementation by a processing unit of a client terminal (and/or methods performed by the client terminal) for transmitting instructions to a server, using available resources which trigged a dropping of a communication session and are sufficient for transmission of the instruction message(s) the server. The instructions include restoration of the bidirectional voice communication with another client terminal. Optionally, the bidirectional voice communication is established when each client terminal is connected to a server using independent respective communication segments. The code identifies when the bidirectional communication has been dropped. The code, optionally a graphical user interface (GUI) associated with a physical user interface of the client terminal, allows the user to enter instructions (and/or automatically generates the instructions) for transmission to the server as one or more messages over the remaining resources. When the server restores the bidirectional voice communication between the client terminals according to the instructions, the code may allow the user to resume the phone call and/or voice call.

Optionally, the code on the client device(s) maintains the bidirectional voice communication with the server in an active state (e.g., prevents termination), for example, by transmission of packets (e.g., keep-alive messages) and/or other data using the bidirectional voice communication, the packets designed to maintain the bidirectional voice communication in the active state. Keep-alive packets may be continuously transmitted, for example, periodically without a significant interruption. Such packets (and/or different packets) may be used (e.g., by the server) to monitor the quality values to detect when sufficient resources are available to provide the desired quality, for restoration of the bidirectional voice communication. In this manner, the systems and/or methods automatically reconnect bidirectional voice communication (e.g., phone and/or video calls) without requiring redialing to establish a new bidirectional voice communication (e.g., manually and/or automatic redial).

Optionally, the bidirectional voice communication is maintained in the background of the client terminal(s), for example, as a background process. Other processes and/or applications may be executed by the client terminal(s), for example, bidirectional voice communications may be established with other different client terminals.

Optionally, the GUI presents different options for restoration of the bidirectional voice communication to the user according to an analysis and/or prediction. Different options may include future time periods for the restoration and/or frequency of attempts. The future time periods may be suggested based on an analysis of available time slots in a calendar application of the user. The future time periods may be suggested and/or predicted based on machine learning methods applied to a history of data, for example, based on a history of phone calls performed by the user, a history of available resources sufficient to provide the desired quality, and/or a history of quality values. The future time periods may be suggested based on an analysis of the type of relationship between the users of the bidirectional voice communication. The relationship type may be extracted by the GUI from social network applications, and/or other applications. For example, when the relationship is boss-worker, the GUI may present options for restoration during work hours. For example, when the relationship is friends, the GUI may present options for restoration during the weekend. The frequency of attempts may be selected by the user, automatically selected, and/or predefined system settings.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is noted that the systems and/or methods described herein are discussed with reference to bidirectional voice communication between two client terminals operated by users. The two client terminal setup is exemplary, and provided for clarity. It is understood that bidirectional voice communication may occur between more than two users (e.g., conference call), in which case every user is able to communicate simultaneously with the other users. It is noted that the server may be in communication with multiple terminal clients having multiple bidirectional voice communications. Each bidirectional voice communication may be independently processed by the server.

As used herein, the term bidirectional voice communication means a real-time interaction between two or more users, in which voice and/or video may be transmitted in either or both directions between the users.

As used herein, the term message or messages means an electronic message transmitted over the network, for example, between the server and a client terminal, and/or between client terminals. The messages may be network messages, such as packets. Examples of messages include individual packets, SMS, IM, email, in-application messaging, and/or messages using other messages protocols and/or other message transmission mechanisms.

As used herein, the terms client terminal and client device (or caller device and/or callee device) are interchangeable.

Figure 2:
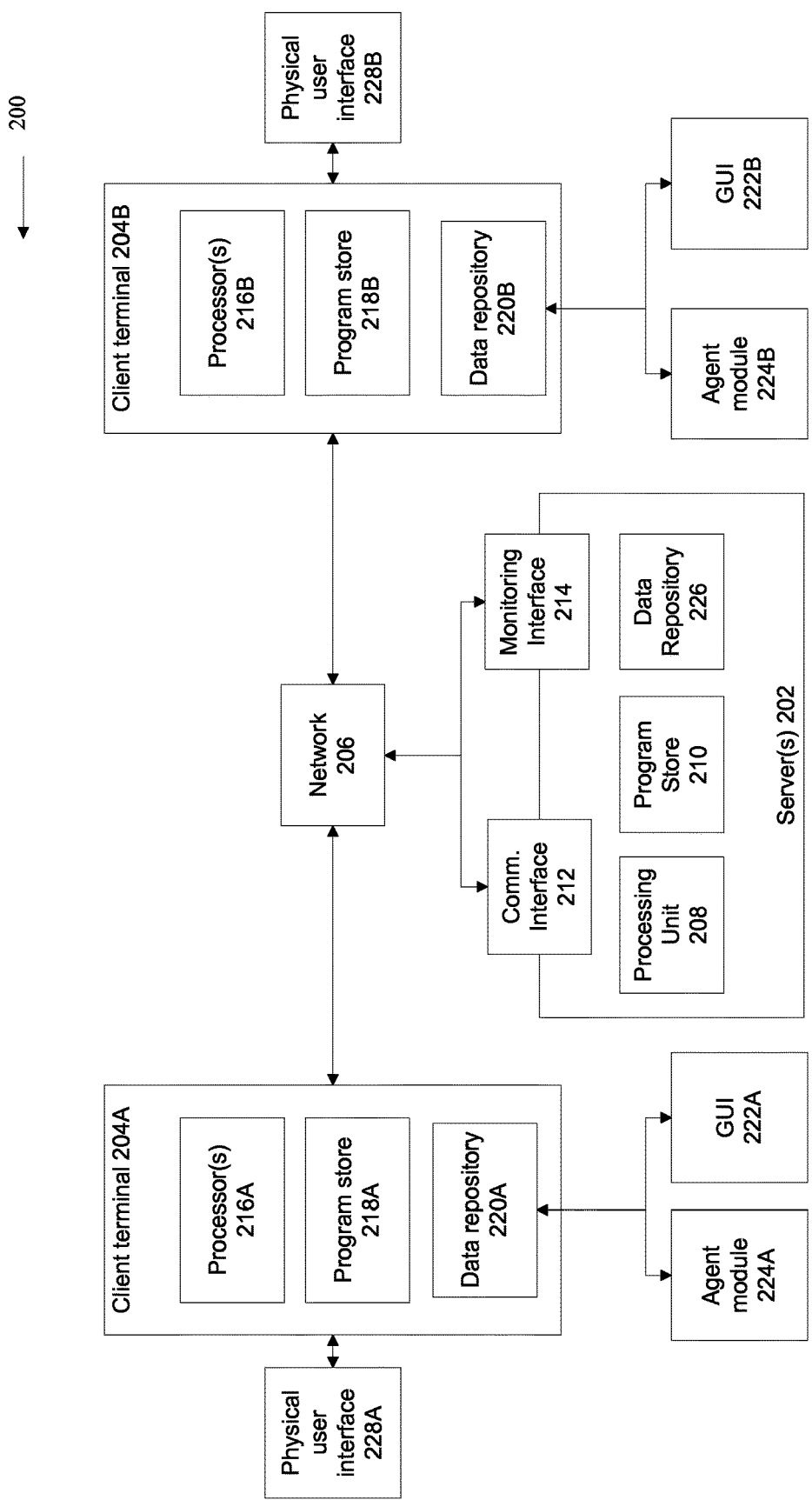
FIG. 2 is a block diagram of a system that reconnects bidirectional voice communication between client devices, in accordance with some embodiments of the present invention.

Reference is now made to FIG. 1, which is a flowchart of a method for restoring and/or maintaining bidirectional voice communication between client terminals, in accordance with some embodiments of the present invention. The method uses existing resources, which are insufficient for a desired quality of the bidirectional communication session (i.e., result in dropping of the communication) and are sufficient for sending messages. An application installed on the client terminal uses the available resources to transmit message(s) to the server, including instructions for restoring the bidirectional voice communication when resources are sufficient for the desired quality. The bidirectional voice communication is restored by the server according to the instructions received using messages from the client terminals. Reference is also made to FIG. 2, which is a block diagram of components of a system that restores bidirectional voice communication between client terminals according to instructions provided by the client terminals, in accordance with some embodiments of the present invention. The system transmits the instructions as messages using available resources, which are insufficient to prevent dropping of the bidirectional voice communication. The system automatically restores the bidirectional voice communication using the server, without the users having to explicitly redial and/or explicitly establish a new bidirectional voice communication, in accordance with some embodiments of the present invention. The method of FIG. 1 may be implemented by the system of FIG. 2.

The systems and/or methods described herein relate to the technical problem of automatically restoring a bidirectional voice communication between client terminals when resources are insufficient to prevent dropping of the bidirectional voice communication (e.g., insufficient to provide a desired quality). The bidirectional voice communication is restored according to instructions provided by the respective client terminals to the server when resources sufficient to prevent dropping of the bidirectional communication (e.g., desired quality) become available. The available resources, which are sufficient for transmission of messages, are utilized to communicate instructions for the restoration between client terminals and the server. The server coordinates the instructions from the client terminals, and attempts restoration accordingly.

The code of the system described herein (and/or related method) may improve performance of the callee and/or caller client terminal, and/or improve performance of the network used for transmission of the bidirectional voice communication. Performance may be improved in terms of processing resources utilization, processing time, storage requirements, and/or communication network parameters (e.g., bandwidth utilization, error rate, and/or jitter). The performance improvement may result from using the available resources (i.e., when resources are sufficient for transmitting messages but insufficient to maintain the communication without dropping) to receive instructions for restoration of the bidirectional voice communication instead of, for example, requiring the users to redial in order to try and establish a new bidirectional voice communication. Establishing a new bidirectional voice communication by users dialing each other may require relatively more computational and/or network resources, for example, due to setting up the new communication, negotiating when to establish the new communication, and/or multiple attempts to establish the communication (e.g., when both parties try to call each other at the same time after a disconnect).

System 200 includes one or more servers 202 that restore bidirectional voice communication between client terminal 204A (also referred to herein as a caller device) and client 204B (also referred to herein as a callee device) over a network 206. It is noted that when the terms first and second client terminals are used, the first and second client terminals are not necessarily related to the caller and/or callee. The terms are used to distinguish the client terminals.

Client terminals 204A-B may be, for example, a mobile device, a Smartphone, a Tablet computer, a wearable computer (e.g., watch, glasses), a desktop computer, a laptop, or other device with communication capabilities.

Network 206 may be, for example, a landline telephone network, a wireless telephone network, a wireless data network, the internet, a private network, and/or combinations thereof. Network 206 transmits the voice communication, at least in part, over a packet network, for example, using voice over internet protocol (VoIP), or other protocols.

Server 202 may be, for example, a central server, a proxy server, a router, a gateway, and/or other network connected computing units. Server 202 includes a processing unit 208, for example, a central processing unit (CPU), a graphics processing unit (GPU), field programmable gate arrays (FPGA), digital signal processor (DSP), and application specific integrated circuits (ASIC). Processing unit 208 may include one or more processors (homogenous or heterogeneous), which may be arranged for parallel processing, as clusters and/or as one or more multi core processing units.

Server 202 includes a program store 210 storing code implementable by processing unit 208, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Server 202 may include multiple computers (having heterogeneous or homogenous architectures), which may be arranged for distributed processing, such as in clusters. Servers 202 may be distributed at different locations within network 206, for example, at strategic points to monitor network traffic passing through different locations within the network.

Server 202 includes a first communication interface 212 for detecting dropping of the bidirectional voice communication established between client terminals 204A and 204B, as described herein. Each client terminal 204A and 204B may establish a segment of the bidirectional voice communication with server 202. Server 202 may monitor each segment independently to detect the dropping, for example, to determine changes in quality values for one segment, while another segment maintains the desired quality level.

Server 202 includes a second communication interface 214 for communicating with client terminals 204A-B by message transmission, as described herein. Interface 212 and 214 may be integrated into a common interface. Interfaces 212 and 214 may be physical interfaces and/or virtual interfaces that provide communication with network 206.

Server 202 may include or be in communication with a data repository 226 for storing data and/or code implementable by processing unit 208, for example, storing the received instructions for restoration of the bidirectional voice communication, as described herein.

Each client terminal 204A-B includes one or more respective processors 216A-B that implement code stored in a respective program store 218A-B, as described herein. Optional respective data repositories 220A-B store data and/or code implementable by the processor, for example, a graphical user interface (GUI) 222A-B as described herein, and/or agent module 224A-B, as described herein.

Client terminals 204A-B include and/or are in communication with one or more respective physical user interfaces 228A-B, for example, a display, a touch screen, a keyboard, a mouse, and voice activated interface.

Blocks of the method of FIG. 1 may be represents as instructions by code stored in program store 210, 218A, and/or 218B, implementable by respective processing units 208, 216A, and/or 216B, as described herein.

At 102, a bidirectional voice communication, such as a voice phone call or video call is established between two or more client terminals. The bidirectional voice communication may be established, for example, by a caller client terminal 204A dialing a phone number of a callee client terminal 204B, with the callee client terminal answering the ring.

Optionally, the bidirectional voice communication is established using server 202. A first communication segment may be established between the caller client terminal and the server. Another communication segment may be established between the server and the callee client terminal. Dropping of the bidirectional voice communication may be detected per segment, to determine which of the segments are affected. The segments may be independently monitored and/or analyzed, to identify when insufficient resources are available in one segment, while sufficient resources are available in the other segment.

The bidirectional voice communication is established at least over a packet network, for example, using VoIP, or other protocols.

The bidirectional voice communication may be established using, for example, a voice calling application, a videoconferencing application, and/or a network calling application, which may be stored in program store 218A-B implementable by respective processors 216A-B.

A session may be established for the bidirectional voice communication, for example, a channel and/or link, such as a virtual channel and/or link.

At 104, server and/or each client terminal detect dropping of the bidirectional voice communication. Optionally, the dropping is detected as related to an affected communication segment between one (or more) of the client terminals and the server. The dropping may be triggered by insufficient resources for maintaining the bidirectional voice communication at a level able to provide voice and/or video call ability, for example, at a desired quality.

Different methods may be used to detect dropping of the call. Optionally, by monitoring of network traffic associated with the bidirectional voice communication, for example, monitoring packets. Monitoring may be performed, for example, by sniffing the network traffic, analyzing received packets, and/or intercepting the network traffic, or other methods.

Optionally, the monitoring is performed by calculating and/or monitoring quality value(s) of quality parameter(s) of the bidirectional voice communication. The quality parameter(s) may be related to transmission performance of the packet network. The quality parameters may be associated with the ability of the network to delivery voice data using packets in real time. The quality parameters may be correlated with the sound quality of the bidirectional voice communication, for example, related to muffled or clear voice, delays, and/or missing parts of the conversation. Examples of quality parameters include one or more of: packet latency, packet loss, and jitter.

Alternatively or additionally, the quality parameters are related to one or more factors that lead to network performance, for example, wireless signal strength, available bandwidth, bandwidth utilization, and number of connected users.

Optionally, the server and/or each client terminal, analyze changes in the quality value(s) to detect when resources are insufficient for maintaining the bidirectional voice communication in a desired quality. For example, the desired quality level may be represented by a first threshold and/or range. The desired quality may be, for example, voice quality as compared to a defined standard, as compared to a traditional circuit switched network (e.g., landline), based on a user definition, and/or based on a system configuration. The first threshold may be, for example, a function, an absolute value, and/or a dynamic value. The desired quality may be represented by one or more quality parameters, for example, individually, in combination, and/or as a function. The server may detect when the quality value changed, for example, from being above the first threshold to below the first threshold.

The server and/or each client terminal may analyze the changes in the quality value(s) to detect when resources are sufficient for transmission of message(s) between the respective client terminal and the server. For example, the quality value may be above a second threshold and/or range.

The resources include, for example, wireless signal strength, the wireless communication medium, network availability, network resources, and/or other resources that are associated with transmission of data over the network as part of the bidirectional voice communication.

The detection may be performed, for example, by an analysis in changes of the quality value(s), or other parameters, for example, signal strength, available bandwidth, and/or ability to transmit and/or receive data over the network.

The case of insufficient resources to provide desired quality and sufficient resources for transmission of messages may occur, for example, when the user enters a geographical location having poor wireless connectivity, for example, an elevator, a basement, or a tunnel.

At 106, instructions for restoring the bidirectional communication are received by the client terminal that was affected by the dropping of the bidirectional voice communication (e.g., having the affected communication segment). Instructions may be received from the user, using the GUI and the physical user interface, for example, the touch-screen.

Instructions may be received by the server from the other client terminal (i.e., having the unaffected communication segment). The instructions from the other client terminal may be received, for example, in response to code installed on the other client terminal receiving a message from the server indicating a problem with the bidirectional communication, and/or the code automatically detects that there is a problem with the first client terminal.

Figure 3:
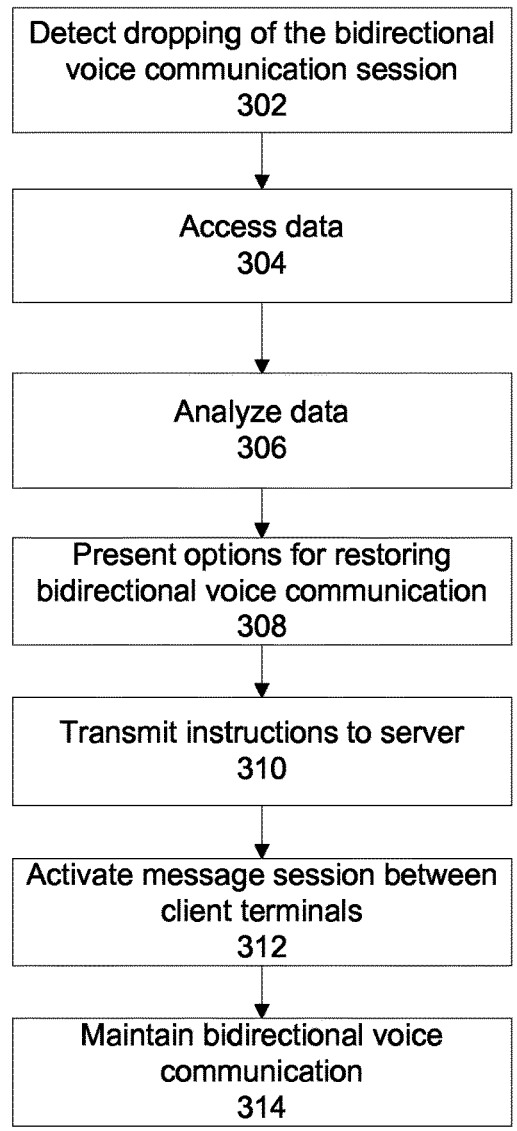
FIG. 3 is a flowchart of a method for generating and/or presenting options for restoring bidirectional voice communication between client devices, in accordance with some embodiments of the present invention.

Reference is now made to FIG. 3, which is a flowchart of a method for generating and/or presenting options for restoring bidirectional voice communication between client devices, in accordance with some embodiments of the present invention. The method of FIG. 3 may be implemented by client terminal(s) in response to detecting dropping of the bidirectional voice communication. The method of FIG. 3 may be implemented as instructions stored as code in respective program stores 218A-B, implementable by respective processors 216A-B of respective client terminals 204A-B.

The method (or portions thereof) may be implemented by code obtained from server 202 (and/or other servers and/or other sources, such as loaded from storage). The code may be provided by server 202 as software as a service (Saas) to client terminals 204A-B, as an application (e.g., agent module 224A-B) for local download to data repository 220A-B of client terminals 204A-B, and/or provided as a remote access session through a web browser.

The code (e.g., agent module 224A) includes instructions to present a graphical user interface (GUI) (e.g., 222A-B) on a screen (e.g., 228A-B) associated with client terminals 204A-B. GUI includes code to receive the instructions from the respective user for coordinating the restoration of the bidirectional voice communication, for example, the user manually selects one of the available options by entering data into the GUI using the touch-screen. The received instructions are transmitted back to the server using the available resources, as network messages, for example, IM, SMS, or other messaging protocols.

The GUI may provide an interface for coordinating and/or negotiating restoration of the bidirectional voice communication.

The GUI may learn previous data patterns, predict options for the restoration of the bidirectional voice communication according, and presents the suggested predicted options.

At 302, one or both (or more such as in a conference call) client devices detect dropping of the bidirectional voice communication session. Optionally each client detects whether its respective communication segment with the server is affected. Optionally, client terminals detect insufficient resources to provide desired quality.

Optionally, client terminals detect sufficient resources for transmitting a message(s) to the server. Alternatively, the client terminals attempt transmittal of the messages to the server, without necessarily detecting whether or not resources are sufficient for the message transmission.

Alternatively or additionally, when a first client terminal detects that its segment is affected and the second client has sufficient resources to maintain the communication (i.e., unaffected segment), the process to obtain instructions at the second client may be triggered, for example, from a message from the first client, a message from the server, and/or by the second client detecting a problem with resource of the first client (e.g., voice is not arriving).

Optionally, at 304, data is accessed to provide one or more options for the instructions for restoring the bidirectional voice communication. Data may be accessed on the client terminal (e.g., stored locally in the data repository), and/or remotely (e.g., stored on a remote server). Data may be automatically accessed by instruction code, optionally associated with the GUI. Data may be accessed by interfacing with other applications, for example, using an application programming interface (API) or other interfaces.

Optionally, the GUI automatically accesses a calendar application installed on the respective client terminal. The GUI may identify one or more time slots using the calendar application that represent available times for restoring the bidirectional voice communication. For example, free time slots may be selected. Alternatively or additionally, the GUI automatically accesses a global positioning system device (GPS), a navigation application, and/or other geographical positioning application, to obtain the current geographical position of the client terminal, and/or a history of locations. Alternatively or additionally, the GUI accesses a call log (e.g., stored in the data repository of the client terminal) to obtain a history of calls made and/or received. Alternatively or additionally, the GUI accesses a social network application and/or social network server to extract a relationship type of the users of the bidirectional voice communication, for example, family, friends, co-workers, supervisor-employee, colleagues, and acquaintances. Alternatively or additionally, the GUI may access a log tracking the quality value over time. It is noted that the log may be located on the server and/or on the client terminal.

Optionally at 306, an analysis is performed of the accessed data. Optionally, machine learning methods may be employed to analyze the accessed data, to predict one or more options for restoration of the bidirectional voice communication. Supervised and/or unsupervised approaches may be used. For example, data (e.g., free time slots, geographical locations, and/or history of calling patterns) may be labeled with corresponding quality values, to predict future quality values according to current data. It is noted that the analysis may be performed locally at each respective client terminal and/or central at the server. Examples of supervised machine learning methods include neural networks, support vector machines, deep learning, decision trees, hard and/or soft thresholding, naïve bayes classifiers, and/or other methods. Examples of unsupervised machine learning methods include K-nearest neighbors (KNN) clustering, Gaussian Mixture Model (GMM) parameterization, or other methods. It is noted that combinations of methods may be applied, sequentially and/or simultaneously. Alternatively or additionally, simpler learning methods may be applied, for example, identifying a set of rules, correlations, and/or conditions.

Examples of data analysis include:

Analyzing patterns of the quality value and/or the availability of resources to maintain the bidirectional voice communication (i.e., prevent dropping) as a function of time. The analysis may be used to predict time period (s) when sufficient resources are predicted to be available for the desired quality. For example, the network may experience less traffic at night.

Analyzing patterns of the quality value and/or availability of sufficient resources as a function of geographical location of the respective client terminal. The analysis may be used to predict and/or identify geographical locations associated with sufficient resources to provide the desired quality. The geographical locations may be analyzed as a function of time, used to predict where the client terminal(s) will be located when. The prediction may be used to identify time slots when the client terminal will be located at a geographical location associated with sufficient resources. For example, the user may be driving to work on a daily basis, and passing through a tunnel in which insufficient resources are available. The identified time slot may exclude the predicted time the user is expected to be in the tunnel.

Analyze the calendar to identify available time slots for the restoration. For example, a daily time slot designated for meetings may be used.

Analyze the relationship type to identify available time slots. For example, relationships related to work (e.g., colleagues) may be associated with time slots during work hours (e.g., 8 AM to 6 PM), relationships related to friends may be associated with time slots during evenings and/or weekends, and relationships related to family may be associated with any time.

It is noted that data may be analyzed in combination, for example, the relationship to narrow down the available time slots, the calendar to identify a sub-set of available time slots from the designated relationship based time, and the geographical location to identify the best times and/or geographical locations. For example, the analysis may determine that the best time to call a friend is on the drive home after a work day.

At 308, the GUI presents the options for restoring the bidirectional voice communication on the screen associated with the respect client terminal. The user may select the option to transmit to the server, for example, by clicking and/or highlighting the option, and/or by manually entering an option, such as a suitable time period.

Optionally, the options presented are based on the message received from the server, for example, whether or not the other user wants to restore the bidirectional voice communication.

Alternatively or additionally, the options presents are based on predefined time slots (e.g., selected by the user, and/or system administrator), and/or the user manually enters desired time slots for restoring the bidirectional voice communication. For example, the user many select to attempt restoration multiple times, attempt during preselected times, attempt anytime, start to attempt restoration only after at least 5 minutes have passed, attempt for the next hour and no more, and attempt during 2-5 pm today.

Alternatively or additionally, the options presents are based on responses received (e.g., directly and/or via the server) from other client terminals, for example, presenting a list of available time options obtained from the other user and asking which is suitable for the present user. Such options may be part of a negotiation and/or coordination process to identify common instructions (e.g., common time slots) for restoring the bidirectional voice communication, for example, as described with reference to block 110 of FIG. 1.

Alternatively or additionally, the options presented are based on the analysis of block 306. For example, the options include the predicted time slots associated with sufficient resources indentified in block 306.

Alternatively or additionally, suggestions are displayed to try and improve the quality value and/or available resources. The suggestions may be received as messages from the server for example, as described with reference to block 110 of FIG. 1. The suggestions may be locally generated, for example, a notification that a current geographical location of the user is different than an identified geographical location that is associated with sufficient resources. The user may receive instructions to move to the identified location, for example, using a navigation application that presents directions from the current location to the identified location.

At 310, the received instructions are transmitted from the respective client terminal to the server. The instructions may be transmitted as a message, such as network message, including the instructions for restoring the bidirectional voice communication according to the user selection options. For example, the message may include desired time slots selected by the user.

The received instructions are transmitted when resources are available for transmission of the message. It is noted that limited resources may be needed for transmission of the relatively small amount of data, for example, transmission may be possible when voice transmission is not possible, such as in a basement, in a tunnel, or in an elevator. The systems and/or methods described herein use the limited resources that are available, to communicate with the server, to provide instructions for automatic future restoration of the bidirectional voice communication.

Optionally, at 312, an instant message session (e.g., IM, SMS, in-application messaging, email, and/or other methods) between the client terminals is automatically established, for example, triggered by the GUI. The instant message session may be activated in response to detecting the insufficient resources and/or in response to receiving the message from the server (which may arrive when the server detects insufficient resources).

The messaging session uses the remaining insufficient resources which are able to transmit messages but unable to provide the desired quality for voice. The messaging session may be used by the users to continue their conversation. Optionally, at 314, the bidirectional voice communication is maintained in the active state in the background of the client device and/or caller device, for example, the link is not disconnected. The bidirectional voice communication may be maintained in the active state by the client terminals, for example, by transmission of packets designed to keep the communication (e.g., session) active. The bidirectional voice communication may be maintained in the active state centrally by the server, for example, as discussed with reference to block 114.

Optionally, another bidirectional voice communication is executed in the foreground of the client terminal to another different client terminal. For example, the user may make another call to a different user while waiting for the previous communication to resume at the designated time.

Referring now back to FIG. 1, at 108, the server receives instructions from one or both client terminals for restoring the bidirectional voice communication. The instructions may be transmitted as messages using the available resources which are insufficient to provide the desired quality for voice (i.e., can't sustain the communication without dropping) but sufficient for transmission of one or more messages. For example, instructions may include the option to restore the bidirectional voice communication or not to restore, and/or when to restore, for example, as described herein in additional detail.

The instructions are transmitted as messages, such as network messages, using a message mechanism. Examples of message mechanisms include: instant messaging (IM), short message service (SMS), and in-application messages.

The bidirectional voice communication and the messages may be transmitted over a common communication interface having common resources. For example, using common network transmission paths, using a common established session, and/or using common links. Such a case may occur on the segment having insufficient resources (e.g., between the first client terminal and the server). Alternatively, common network resources are used (e.g., common network, common air interface), with different transport protocols for the messages (e.g., IM, SMS) and for the bidirectional voice communication (e.g., VoIP). Such a case may occur on the segment having sufficient resources (e.g., between the second client terminal and the server).

Optionally, at 110, code implemented by the server analyzes the received instructions from the caller client terminal and the callee client terminal to coordinate and/or identify common instructions for restoring the bidirectional voice communication. The analysis may be performed when both client terminals respond with instructions to attempt the restoration.

When one client terminal responds with instructions for restoration, while another client terminal has not responded, the server may send the first message or update message to the other client terminal that has not yet responded indicating the response of the other. For example, the message may include desired times to attempt restoration selected by the responding client terminal, to allow the other client terminal to select from the provided times.

When clients reply with different instructions, such as different times to attempt the restoration, the server may identify one or more common instructions, such as common times for the restoration. When the server is unable to identify common times, the server may send additional message to one or both client terminals to coordinate and/or negotiate common instructions.

The code may fail to identify common instructions, for example, when one client terminal replies that a restoration is not desired, and another client terminal replies that a restoration is desired. In such a case, no restoration is performed, and the session may be terminated.

Optionally, at 112, the server may perform one or more actions related to the restoration.

Optionally, the action is related to the analysis of the received instructions. The server may transmit one or more additional messages to the caller client terminal and the callee client terminal to coordinate and/or negotiate common instructions for restoring the bidirectional voice communication.

Alternatively or additionally, the action is related to an analysis of the quality value and/or available resources. The action may include automatically generating a request for improving the quality value and/or sufficiently increasing resources to provide the desired quality. The request may be transmitted from the server to a network node of the packet network, for example, as an automated request, as an email (or SMS, IM, or other message) to a human administrator to read, and/or as instructions to adjust one or more network parameters, for example, designate different quality of service (QoS) network parameters.

Alternatively or additionally, the action is related to an analysis that identifies the caller terminal client and/or the callee terminal client as associated with the insufficient resources, for example, when packets transmitted to a certain terminal client have quality values associated with sufficient resources and packets arriving from the certain terminal client have quality values associated with insufficient resources, the certain terminal client is identified. The server may transmit a message to the identified device including a request and/or suggestion to improve the quality value, for example, asking the user to move to another location and/or asking the user to call their provider to solve the problem.

Optionally, at 114, the bidirectional voice communication is maintained in an active state when the insufficient resources are available to provide the desired quality, and when the available resources allow for sending messages. The bidirectional voice communication may be maintained by maintaining the session used to transmit voice carrying packets over the network. The bidirectional voice communication may be passively maintained, for example, by not issuing instructions to terminate the bidirectional voice communication and/or underlying session. The bidirectional voice communication may be actively maintained, for example, by issuing instructions to prevent termination of the bidirectional voice communication and/or underlying session. The maintenance may be performed by the server and/or by the client terminals.

Optionally, the server periodically (e.g., at predefine times, when needed, in response to events, in response to queries, and/or continuously) transmits messages (e.g., packets) to keep the bidirectional voice communication and/or session alive, for example, keep alive message. Messages may be transmitted to the caller client terminal, the callee client terminal, to a network node (e.g., router, administrative server), and/or across the link.

Optionally, the bidirectional voice communication is maintained in the state of the insufficient resources for providing desired quality and sufficient resources for sending messages until the server detects that sufficient resources are available to provide the desired quality. The detection may be performed based on an analysis of a change in the quality value, for example, detecting when the quality value rises to above the first threshold.

Optionally, at 116, the server restores (and/or attempts to restore) the bidirectional voice communication according to the received instructions and/or the coordinated instructions. The restoration is performed without requiring the users to redial. The user may be prompted that restoration has occurred, for example, the server sends a message to the client terminals. The message may be presented by the GUI on the screen of the client terminal, for example, stating that restoration is occurring, and allowing the user to accept or decline the restoration.

The restoration is attempted when sufficient resources become available to provide the desired quality for the bidirectional voice communication.

The restoring may be attempted multiple times, according to the received instructions.

The restoring may be performed at one or more of the preselected time according to the instructions received from the client terminals.

Alternatively, the reconnection is performed automatically by the server without sending messages to the client terminals requesting instructions (i.e., without blocks 106-112), for example, when the quality value is below the first threshold and above the second threshold for a period of time below a threshold time value, which may represent a short period of time, for example, about 1 second, or about 2 seconds, or about 5 seconds. Alternatively, the server waits for the quality value to return according to the threshold time value. Once the threshold time value has elapsed, the server may proceed with blocks 106-112.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and/or systems will be developed and the scope of the terms client terminals, servers, and packet networks are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for restoring bidirectional voice communication between at least two client terminals, comprising:
   detecting, by a server, a dropping of a bidirectional voice communication on a communication segment between a first client terminal and the server, the communication segment part of the bidirectional voice communication established between the first client terminal and a second client terminal using respective communication segments with the server, the dropping triggered by insufficient resources for maintaining the bidirectional voice communication in a desired quality for the first client terminal,
   receiving, at the server, at least one message from the first client terminal, the at least one message including instructions for restoring the bidirectional voice communication, the at least one message received over available resources sufficient for transmission of the at least one message over the affected communication segment;
   automatically activating an instant message session between the first client terminal and the second client terminal in response to the detecting; and
   restoring, by the server, the bidirectional voice communication according to the received instructions when sufficient resources are available for maintaining the bidirectional voice communication at the desired quality.

2. The method of claim 1, further comprising receiving at least one second message from the second client terminal, and wherein the restoring is performed in response to the at least one message and the at least one second message.

3. The method of claim 2, further comprising analyzing the received instructions from the first client terminal and the second client terminal to identify common instructions for restoring the bidirectional voice communication.

4. The method of claim 1, further comprising transmitting, at least one second message from the server to at least one of the first client terminal and the second client terminal, the transmitting performed in response to detecting the dropping, the at least one second message including a request to receive instructions for restoring the bidirectional voice communication.

5. The method of claim 1, further comprising transmitting at least one third message from the server to at least one of the first client terminal and the second client terminal to negotiate common instructions for restoring the bidirectional voice communication.

6. The method of claim 1, wherein the bidirectional voice communication and the at least one first message are transmitted over a common communication interface having common resources.

7. The method of claim 1, wherein the bidirectional voice communication remains active during a state of the insufficient resources for maintaining bidirectional voice communication in the desired quality and sufficient resources for sending at least one message.

8. The method of claim 7, wherein the server periodically transmits at least one third message to at least one of the first client terminal and the second client terminal to maintain the active bidirectional voice communication.

9. The method of claim 1, wherein the restoring is performed at a preselected time according to the instructions received from at least one of the first client terminal and the second client terminal.

10. The method of claim 1, further comprising automatically generating at least one request according to an analysis of at least one quality parameter of the bidirectional voice communication session, and transmitting the at least one request from the server to a network node administering the bidirectional voice communication, the at least one request including a request to increase network resources to restore the bidirectional voice communication to the desired quality.

11. A method for restoring bidirectional voice communication between at least two client terminals, comprising:
    establishing, a bidirectional voice communication between a first and a second client terminal, wherein each client terminal is in communication with a server using a respective independent communication segments;
    detecting, by the first client terminal, a dropping of the bidirectional voice communication on the communication segment between the first client terminal and the server, the dropping triggered by insufficient resources for maintaining the bidirectional voice communication in a desired quality;
    receiving from a user, using a physical user interface associated with the first client terminal, instructions for restoring the bidirectional voice communication;
    transmitting, from the first client terminal, at least one message including the received instructions using available resources to the server over the affected communication segment;
    automatically activating an instant message session between the first client terminal and the second client terminal in response to the detecting; and
    resuming the bidirectional voice communication with the second client terminal when the server restores the bidirectional voice communication.

12. The method of claim 11, further comprising transmitting data between the first client terminal and at least one of the second client terminal and the server, the transmitted data designed to maintain the bidirectional voice communication in the active state.

13. The method of claim 11, wherein the bidirectional voice communication is maintained in an active state in the background of the first client terminal, while another bidirectional voice communication is executed in a foreground to a third client terminal.

* * * * *